US006658582B1

United States Patent
Han

(12) United States Patent
(10) Patent No.: US 6,658,582 B1
(45) Date of Patent: Dec. 2, 2003

(54) SERIAL INTERFACE CIRCUITS HAVING IMPROVED DATA TRANSMITTING AND RECEIVING CAPABILITY

(75) Inventor: Young-Tak Han, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/140,259

(22) Filed: Aug. 26, 1998

(30) Foreign Application Priority Data

Aug. 26, 1997 (KR) ........................................ 10-0041292

(51) Int. Cl.[7] ................................................. G06F 1/04
(52) U.S. Cl. ........................ 713/500; 713/600; 710/305
(58) Field of Search ................................. 713/400, 500, 713/501, 600; 710/107, 129, 130, 61, 71, 305, 306; 327/100, 141, 164; 348/500, 521; 375/238, 239

(56) References Cited

U.S. PATENT DOCUMENTS

| | | | | |
|---|---|---|---|---|
| 4,342,001 A | * | 7/1982 | Sauer | 330/9 |
| 4,435,761 A | * | 3/1984 | Kimoto | 710/61 |
| 4,550,437 A | * | 10/1985 | Kobayashi et al. | 345/505 |
| 4,641,276 A | * | 2/1987 | Dunki-Jacobs | 710/71 |
| 4,648,102 A | * | 3/1987 | Riso et al. | 375/356 |
| 4,715,052 A | * | 12/1987 | Stambaugh | 377/105 |
| 5,204,739 A | * | 4/1993 | Domenicali | 348/79 |
| 6,072,534 A | * | 6/2000 | Dell'ova et al. | 348/524 |

* cited by examiner

Primary Examiner—Thomas Lee
Assistant Examiner—Thuan Du
(74) Attorney, Agent, or Firm—Myers Bigel Sibley & Sajovec

(57) ABSTRACT

Serial interface circuits include first and second data registers (RXDR, TXDR) responsive to first and second register control signals (Idrd, Idts), respectively, and a shift register (SISOR) responsive to a shift clock signal. The preferred shift register has a serial input port, a serial output port and a parallel input/output port electrically coupled to the first and second data registers. A preferred controller circuit is also provided. This controller circuit, which is responsive to a frame synchronization signal (Fsync), generates the first and second register control signals during nonoverlapping time intervals. The frame synchronization signal has a first pulse width during a first time interval and the controller circuit also includes a half-frame synchronization signal generator which generates a half-frame synchronization signal (Hlf_Fsync) having a second pulse width during the first time interval. The controller circuit also includes a data register controller to generate the first and second register control signals as respective pulses during the first time interval. The half-frame synchronization signal is preferably generated as a pulse during a second-half of the first time interval and the first and second register control signals are preferably generated as respective pulses during the second-half of the first time interval. If the second-half of the first time interval is defined as a second time interval, then the first register control signal is preferably generated as a pulse during a first-half of the second time interval and the second register control signal is preferably generated as a pulse during a second-half of the second time interval.

22 Claims, 5 Drawing Sheets

SERIAL INTERFACE CIRCUITS HAVING IMPROVED DATA TRANSMITTING AND RECEIVING CAPABILITY

FIELD OF THE INVENTION

The present invention relates to integrated circuits, and more particularly to integrated circuits having serial interface circuits therein.

BACKGROUND OF THE INVENTION

FIG. 1 is a schematic block diagram of an integrated circuit containing a digital signal processor (DSP) 100, a serial interface circuit 200 and a coder-decoder circuit (CODEC) 300. The DSP 100 is connected through data and control buses 120 and 130 to the serial interface circuit 200. Although not illustrated in FIG. 1, the DSP 100 may also be associated with various other units which are communicatively coupled to the serial interface circuit 200. A selector 110 is used to select one of the various units associated with the DSP 100 in accordance with a plurality of select signals from the DSP 100. The selector 110 supplies a data output enable signal wr_txd and a data input enable signal rd_rxd through the control bus 120 to the serial interface circuit 200. The serial interface circuit 200 may receive serial data DRX from the CODEC 300 and then convert the received serial data DRX into parallel data which can be transferred to the DSP 100 in response to a frame synchronization signal Fsync and a shift clock signal Sftclk. The serial interface circuit 200 also receives parallel data from the DSP 100 (via the data bus 130), converts the received parallel data into serial data DTX capable of being transferred to the CODEC 300, and transfers the parallel data thus converted to the CODEC 300. A detailed block diagram of the serial interface circuit 200 according to the prior art is illustrated in FIG. 2.

As shown in FIG. 2, the serial interface circuit 200 consists of a first shift register 210, a first data register 220, a second data register 230, a second shift register 240 and a controller 250. The first shift register 210 receives serial data DRX transferred from the CODEC 300 and shifts in the received serial data DRX in response to the shift clock signal Sftclk. The first data register 220 fetches the contents in the corresponding shift register 210 is parallel (in response to a first data register control signal ldrd issued from the controller 250), when the transfer of the serial data DRX from the CODEC 300 has been completed. The first data register 220 then outputs the fetched data through the data bus 130 to the DSP 100 in response to the data input enable signal rd_rxd which is supplied by the selector 110 (via the control bus 120). According to the above-mentioned functional description, the first shift register 210 may be configured as a serial-in-parallel-out (SIPO) buffer register and the first data register 220 may be configured as a parallel-in-parallel-out (PIPO) buffer register.

The second data register 230 receives parallel data to be transferred to the CODEC 300 in response to the data output enable signal wr_txd (which is supplied from the selector 110 through the control bus 120). The received parallel data is then transferred in parallel to the second shift register 240, in response to a second data register control signal ldts from the controller 250. The second shift register 240 shifts out the received parallel data one bit at-a-time in response to each cycle of the shift clock signal Sftclk. The data DTX output from the second shift register 240 is then serially transferred to the CODEC 300. According to above-mentioned functional description, the second shift register 240 may be configured as a parallel-in-serial-out (PISO) buffer register and the second data register 230 may comprise the same PIPO buffer register as the first data register 220.

The controller 250 generates an interrupt signal CINT in response to the shift clock signal Sftclk, the frame synchronization signal Fsync (indicating the end of a frame of the serial data DRX) and a clock signal CLK used in the DSP 100. The interrupt signal CINT is supplied via the control bus 120 to the DSP 100. The interrupt signal CINT causes the selector 110 to generate the data input enable signal rd_rxd (so that the contents of the first data register 220 can be transformed via the data bus 130 to the DSP 100). The data output enable signal wr_txd is also generated by the selector 110 so that parallel data from the DSP 100 can be transferred via the data bus 130 to the serial interface circuit 200.

Unfortunately, the number of bits to be converted by the serial interface circuit 200 cannot be increased without a concomitant increase in the size of the shift and data registers therein. Accordingly, the circuit of FIGS. 1–2 may not be suitable for applications requiring wide bandwidth data transfers.

SUMMARY OF THE INVENTION

It is therefore an object of the present invention to provide improved serial interface circuits and methods of operating same.

It is another object of the present invention to provide serial interface circuits having wide bandwidth data transfer capability and methods of operating same.

These and other objects, advantages and features of the present invention are provided by serial interface circuits which comprise first and second data registers responsive to first and second register control signals, respectively, and a shift register responsive to a shift clock signal. The preferred shift register has a serial input port, a serial output port and a parallel input/output port electrically coupled to the first and second data registers. A preferred controller circuit is also provided. This controller circuit, which is responsive to a frame synchronization signal, generates the first and second register control signals during nonoverlapping time intervals to thereby enable use of only one shift register by preventing interference between data being transferred to and from the first and second data registers, respectively. According to preferred aspects of the present invention, the frame synchronization signal has a first pulse width during a first time interval and the controller circuit also includes a half-frame synchronization signal generator which generates a half-frame synchronization signal having a second pulse width, less than the first pulse width, during the first time interval. The controller circuit also includes a data register controller to generate the first and second register control signals as respective pulses during the first time interval. The half-frame synchronization signal is preferably generated as a pulse during a second-half of the first time interval and the first and second register control signals are preferably generated as respective pulses during the second-half of the first time interval. In particular, if the second-half of the first time interval is defined as a second time interval, then the first register control signal is preferably generated as a pulse during a first-half of the second time interval and the second register control signal is preferably generated as a pulse during a second-half of the second time interval.

The preferred serial transfer circuit may also include a transfer register electrically coupled to the serial output port of the shift register. Here, the transfer register is triggered by a first edge of the shift clock signal and the shift register is triggered by a second edge of the shift clock signal. The half-frame synchronization signal generator may also comprise a latch having a data input responsive to the frame synchronization signal and a clock input responsive to the shift clock signal. An AND gate may also be provided having a first input responsive to the half-frame synchronization signal and a second input electrically coupled to an output of the latch. The first and second edges of the shift clock signal may also be established as the rising and falling edges, respectively, and the latch may be triggered by the falling edge of the shift clock signal.

According to another embodiment of the present invention, a preferred method of operating a serial interface circuit includes the steps of generating a half-frame synchronization signal as a first pulse during a first time interval and serially transmitting first data from a plurality of registers within a shift register to an output thereof while simultaneously serially receiving second data into the plurality of registers. Steps are also performed to transfer the second data in parallel from the shift register to a first data register, during a first-half of the first time interval, and then transfer additional first data from a second data register to the plurality of registers within the shift register, during a second-half of the first time interval.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout and signal lines and signals thereon may referred to by the same reference symbols.

Figure 1:
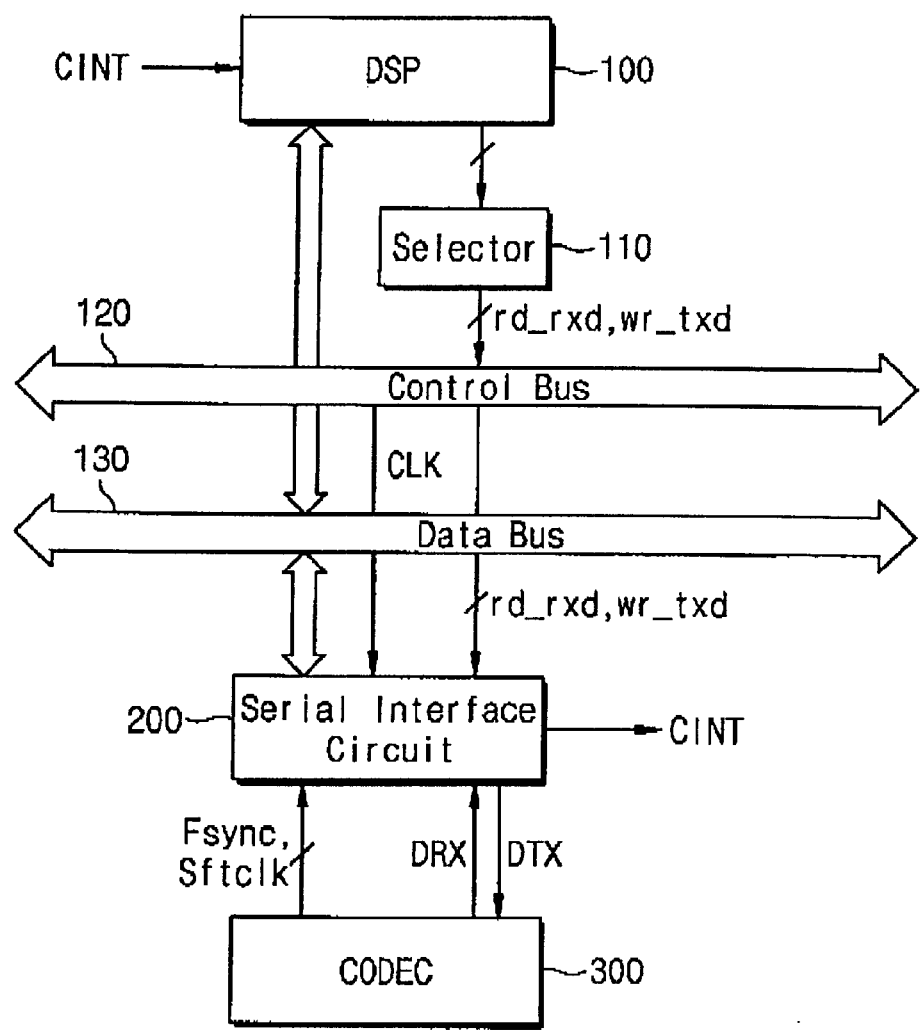
FIG. 1 is block schematic of a conventional integrated circuit containing a digital signal processor, a coder/decoder and serial interface circuit.
Figure 2:
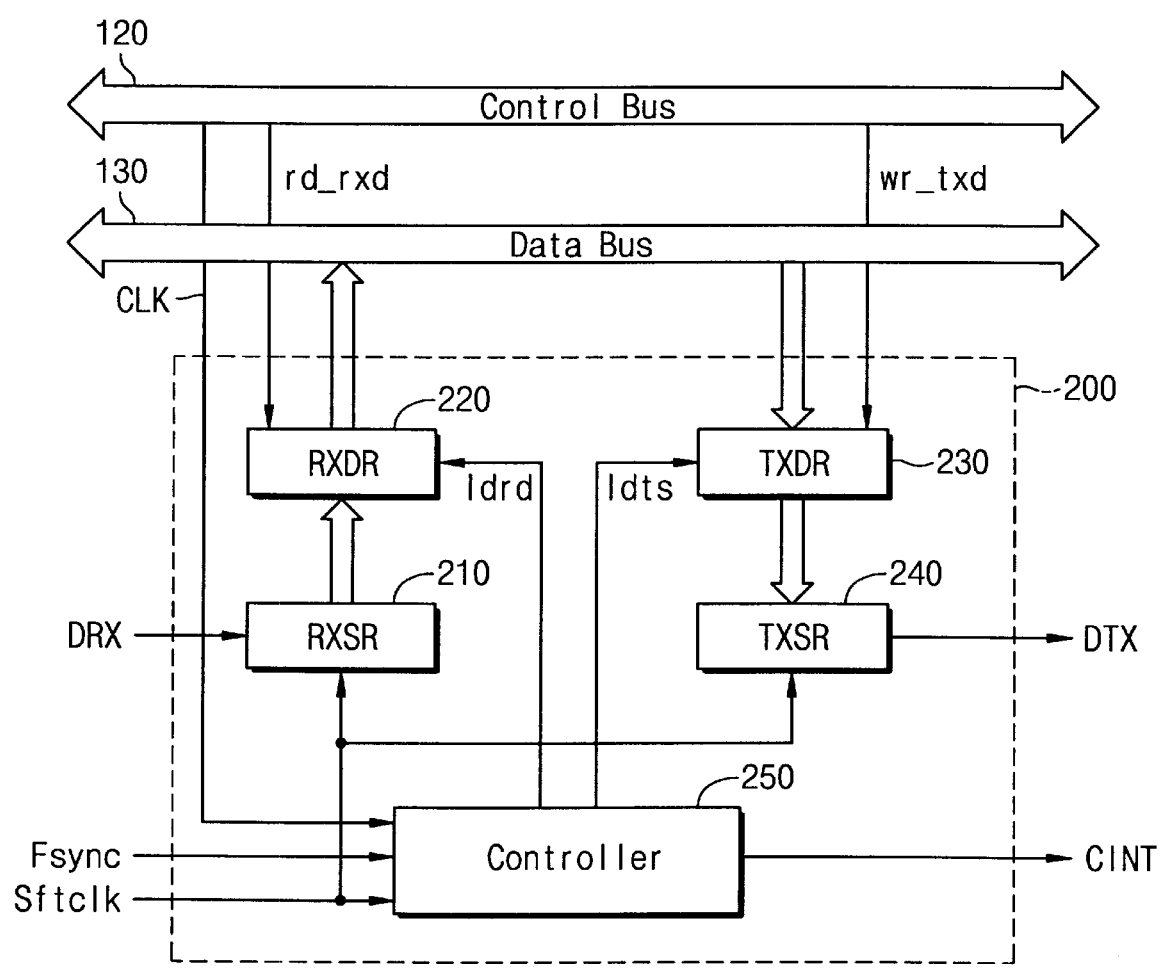
FIG. 2 is a block schematic of the serial interface circuit of FIG. 1.
Figure 3:
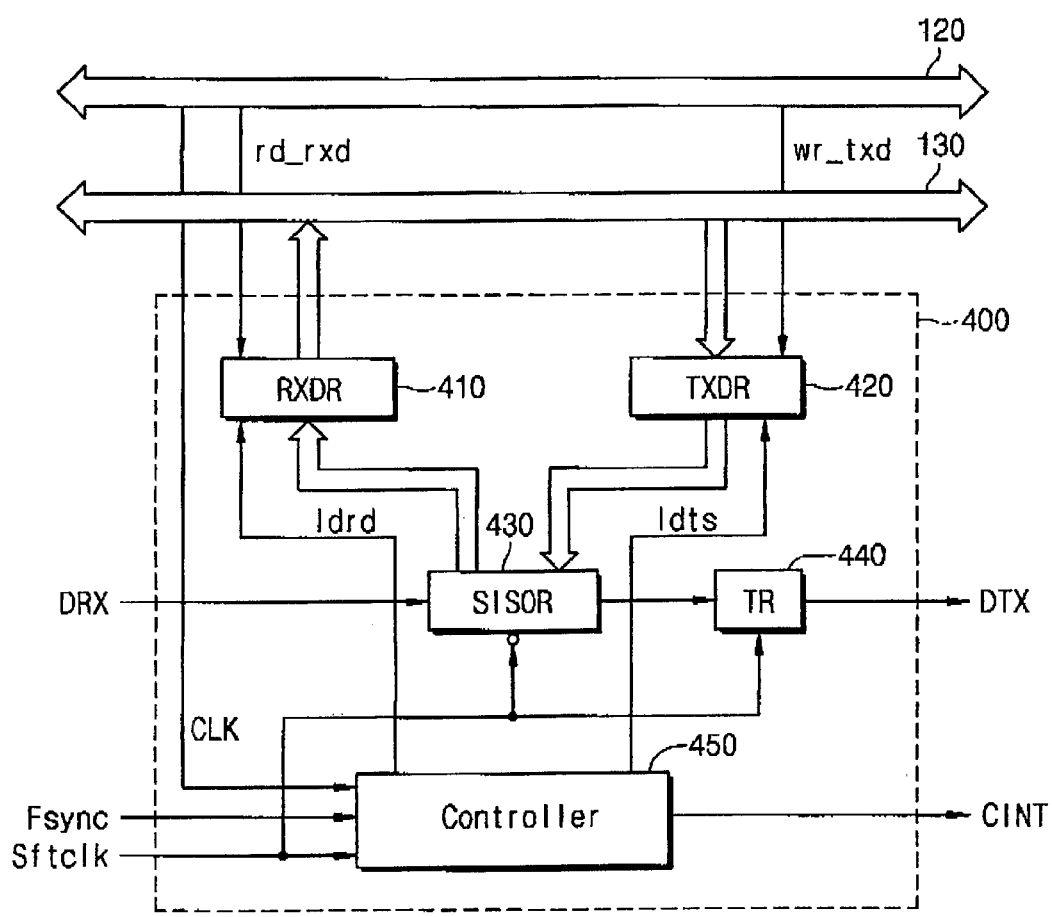
FIG. 3 is a block schematic of a serial interface circuit according to an embodiment of the present invention, which can replace the serial interface circuit of FIG. 1.

FIG. 3 is a block diagram of a serial interface circuit 400 according to a preferred embodiment of the present invention. In FIG. 3, the constituent elements which are similar to those illustrated in FIG. 2, are labeled with the same reference numerals. As shown in FIG. 3, the serial interface circuit 400 of the present invention comprises a first data register 410, a second data register 420, a shift register 430, a transfer register 440, and a controller 450. The first data register 410 fetches the contents of the shift register 430 in response to a first data register control signal ldrd from the controller 450 and then transfers the fetched contents through a data bus 130 to the DSP 100 (see FIG. 1) in response to a data input enable signal rd_rxd. The data input enable signal is transferred by the selector 110 through the control bus 120. The first data register 410 may be a parallel-in-parallel-out (PIPO) buffer register.

The second data register 420 receives parallel data from the DSP 100 in response to a data output enable signal wr_txd which is transferred by the selector 110 through the control bus 120. This parallel data is transferred to the second data register 420 via the data bus 130. The received parallel data is then transferred to the shift register 430 when a second data register control signal ldts is applied to the second data register 420. The second data register control signal ldts is generated by the controller 450. The second data register 420 may also comprise a parallel-in-parallel-out (PIPO) buffer register.

As illustrated in FIG. 3, the shift register 430 is connected to the first data register 410 and the second data register 420, and is operated in-sync with a trailing edge of the shift clock signal Sftclk. The shift register 430 receives serial data DRX transferred from the CODEC 300 and shifts in the received serial data in response to the shift clock signal Sftclk. At the same time, the parallel data transferred from the second data register 420 to the shift register 430 can be shifted out one bit at-a-time in response to the shift clock signal Sftclk. The data from the shift register 430 can therefore be sequentially transferred to the transfer register 440.

For example, assuming that the serial data and the parallel data all are 8-bit data, the 8-bit parallel "write" data is first loaded into the shift register 430. Then, the 8-bit serial "read" data is sequentially transferred (shifted) into the shift register 430 as the parallel "write" data is being serially transferred out of the shift register and into the transfer register 440. These operations are performed in response to the shift clock signal Sftclk. The shift register 430 may be a serial-in-serial-out (SISO) buffer register having a serial input terminal for receiving the serial "read" data, a serial output terminal for serially outputting the parallel "write" data, parallel input/output terminals for receiving the parallel "write" data and outputting the "read" data in the shift register 430 and a clock terminal which is responsive to a trailing edge of the shift clock signal Sftclk.

Referring to FIG. 3 again, the controller 450 receives the frame synchronization signal Fsync, the shift clock signal Sftclk, and a clock signal CLK used by the DSP 100, to generate the first data register control signal ldrd, the second data register control signal ldts, and an interrupt signal CINT. A detailed block diagram of the controller 450 according to the preferred embodiment of the present invention is illustrated in FIG. 4.

Figure 4:
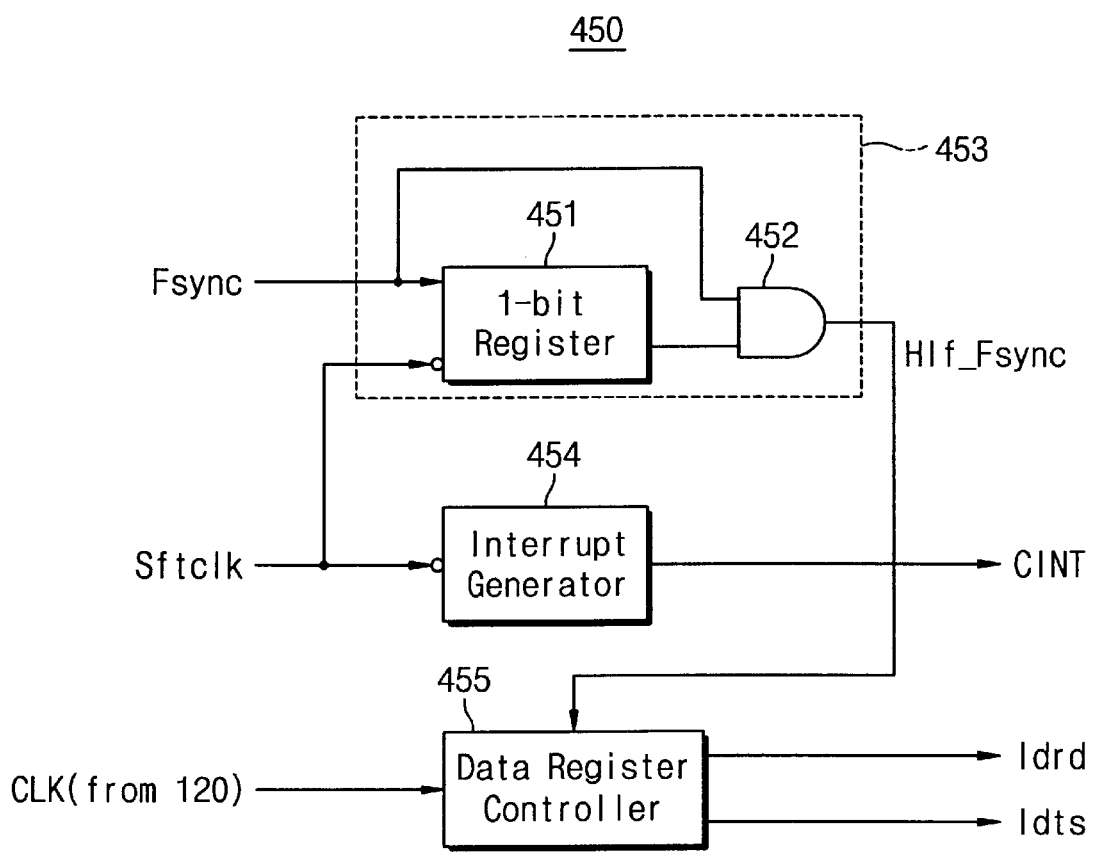
FIG. 4 is a block schematic of the controller of FIG. 3.

Referring to FIG. 4, the controller 450 comprises a half-frame synchronization signal generator 453, an interrupt generator 454, and a data register controller 455 connected to the half-frame synchronization signal generator 453 and the control bus 120 in FIG. 3. The half-frame synchronization signal generator 453 receives the frame synchronization signal Fsync and the shift clock signal Sftclk and then generates a half-frame synchronization signal Hlf_Fsync. The half-frame synchronization signal Hlf_Fsync has a pulse width equal to half a pulse width of the frame synchronization signal Fsync, as illustrated in FIG. 5, and is activated during half a period of the shift clock signal Sftclk.

The half-frame synchronization signal generator 453 comprises a 1-bit register 451 and a two-input AND gate 452. The register 451 has a clock terminal for receiving the shift clock signal Sftclk, an input terminal for receiving the frame synchronization signal Fsync, and an output terminal. One input terminal of the AND gate 452 is supplied with the frame synchronization signal Fsync and the other input terminal thereof is connected to the output terminal of the 1-bit register 451. The AND gate 452 has an output terminal for outputting the half-frame synchronization signal Hlf_Fsync. As illustrated by FIG. 5, when the frame synchronization signal Fsync is activated during one period of the shift clock signal Sftclk, the half-frame synchronization signal Hlf_Fsync will be set to a logic 0 potential during the first half of the period of the shift clock signal Sftclk. However, when the shift clock signal Sftclk is changed from high to low and the 1-bit register 451 receives the high level of the frame synchronization signal Fsync, the AND gate 452 will output the half-frame synchronization signal Hlf_Fsync at a logic 1 potential. Thus, a 1→0 transition of the shift clock signal Sftclk when the frame synchronization signal Fsync is at a logic 1 potential, will cause the half-frame synchronization signal Hlf_Fsync to transition from 0→1.

Figure 5:
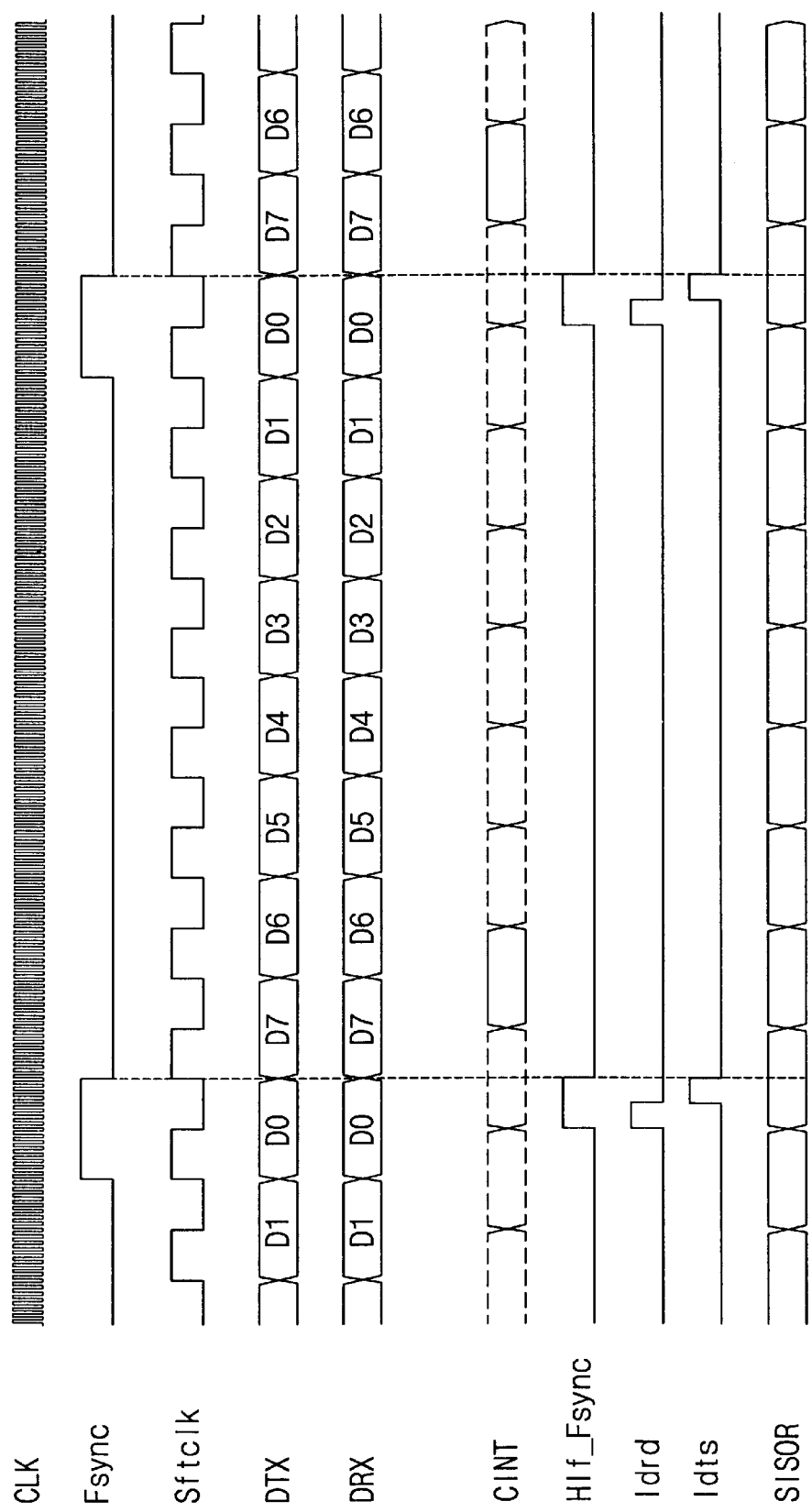
FIG. 5 is a timing diagram which illustrates operation of the serial interface circuit and controller of FIGS. 3–4.

As illustrated by FIG. 5, the data register controller 455 then sequentially generates a first data register control signal Idrd and a second data register control signal Idts in response to a clock signal CLK (used by the DSP 100) while a logic 1 half-frame synchronization signal Hlf_Fsync is being applied thereto. The first data register control signal ldrd is applied to the first data register 410 and the second data register control signal Idts is applied to the second data register 420. The data register controller 455 first generates the first data register control signal ldrd during half an enable period of the half-frame synchronization signal Hlf_Fsync and then generates the second register control signal Idts during the other half of the enable period thereof. The data register controller 455 may be made up of a counter and two logic circuits (e.g., two OR gates for outputting the signals ldrd and Idts, respectively).

The interrupt generator 454 responds to the shift clock signal Sftclk and generates an interrupt signal CINT. The interrupt signal CINT indicates that the serial data to be transferred to the DSP 100 has been loaded into the first data register 410 and the parallel data to be transferred to the CODEC 300 has been loaded into the shift register 430. The signal CINT is supplied to the DSP 100 and causes the DSP 100 to generate the data input/output enable signals rd_rxd and wr_txd through the selector 110. Accordingly, the DSP 100 receives the converted "read" data from the first data register 410 and outputs the parallel "write" data to the second data register 420. The interrupt generator 454 may be made up of a counter (e.g., an n-bit counter, where $2_n$ equals the number of bits in each word).

FIG. 5 is a timing diagram for describing operation of the preferred serial interface circuit 400 of FIGS. 3–4, using 8-bit data words. The shift register 430 is initially loaded in parallel with an 8-bit word. The shift register 430 then receives the 8-bit serial data DRX (D7-D0) to be transferred to the DSP 100 one bit at-a-time, at a negative edge of the shift clock signal Sftclk. At the same time, the loaded 8-bit parallel data is shifted by one bit in accordance with the negative edge of the shift clock signal Sftclk. The one bit which is initially shifted out of the shift register 430 is then transferred to the transfer register 440 at a positive edge of the shift clock signal Sftclk. After the 8-bit parallel data and the 8-bit serial data have been shifted out and in, respectively, the controller 450 generates the first data register control signal ldrd and then generates the second data register control signal Idts. This makes the first data register 410 perform a parallel fetch of the contents of the shift register 430 and then the second data register 420 outputs the contents thereof in parallel to the shift register 430. The controller 450 then generates the same interrupt signal CINT (as depicted by the solid line of FIG. 5), and this causes the DSP 100 to fetch the contents of the first data register 410 by generating the data input enable signal rd_rxd.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A serial interface circuit, comprising:

first and second data registers responsive to first and second register control signals, respectively;

a shift register responsive to a shift clock signal and having a serial input port, a serial output port and a parallel input/output port electrically coupled to said first and second data registers;

means, responsive to a frame synchronization signal, for generating the first and second register control signals during nonoverlapping time intervals;

wherein the frame synchronization signal has a first pulse width during a first time interval; and wherein said generating means comprises:

means for generating a half-frame synchronization signal having a second pulse width, less than the first pulse width, during the first time interval, and means for generating the first and second register control signals as respective pulses during the first time interval.

2. The serial interface circuit of claim 1, wherein the half-frame synchronization signal is generated as a pulse during a second-half of the first time interval; and wherein the first and second register control signals are generated as respective pulses during the second-half of the first time interval.

3. The serial interface circuit of claim 2, wherein the second-half of the first time interval corresponds to a second time interval; and wherein the first register control signal is generated as a pulse during a first-half of the second time interval and the second register control signal is generated as a pulse during a second-half of the second time interval.

4. The serial interface circuit of claim 3, further comprising a transfer register electrically coupled to the serial output port of said shift register.

5. The serial interface circuit of claim 4, wherein said transfer register is triggered by a first edge of the shift clock signal; and wherein said shift register is triggered by a second edge of the shift clock signal.

6. The serial interface circuit of claim 3, wherein said means for generating a half-frame synchronization signal comprises a latch having a data input responsive to the frame synchronization signal and a clock input responsive to the shift clock signal.

7. The serial interface circuit of claim 6, wherein said means for generating a half-frame synchronization signal comprises an AND gate having a first input responsive to the half-frame synchronization signal and a second input electrically coupled to an output of the latch.

8. The serial interface circuit of claim 7, wherein the first and second edges of the shift clock signal are rising and falling edges, respectively; and wherein the latch is triggered by the falling edge of the shift clock signal.

9. An integrated circuit, comprising:
a digital signal processor;
a coder/decoder circuit which generates a frame-synchronization signal and a shift clock signal; and
a serial interface circuit, said serial interface circuit comprising:
first and second data registers responsive to first and second register control signals, respectively;
a shift register responsive to a shift clock signal and having a serial input port, a serial output port and a parallel input/output port electrically coupled to said first and second data registers;
means, responsive to a frame synchronization signal, for generating the first and second register control signals during nonoverlapping time intervals;
wherein the frame synchronization signal has a first pulse width during a first time interval; and
wherein said generating means comprises:
means for generating a half-frame synchronization signal having a second pulse width, less than the first pulse width, during the first time interval, and
means for generating the first and second register control signals as respective pulses during the first time interval.

10. The circuit of claim 9, wherein the half-frame synchronization signal is generated as a pulse during a second-half of the first time interval; and wherein the first and second register control signals are generated as respective pulses during the second-half of the first time interval.

11. The circuit of claim 10, wherein the second-half of the first time interval corresponds to a second time interval; and wherein the first register control signal is generated as a pulse during a first-half of the second time interval and the second register control signal is generated as a pulse during a second-half of the second time interval.

12. The circuit of claim 11, further comprising a transfer register electrically coupled to the serial output port of said shift register.

13. The circuit of claim 12, wherein said transfer register is triggered by a first edge of the shift clock signal; and wherein said shift register is triggered by a second edge of the shift clock signal.

14. The circuit of claim 11, wherein said means for generating a half-frame synchronization signal comprises a latch having a data input responsive to the frame synchronization signal and a clock input responsive to the shift clock signal.

15. The circuit of claim 14, wherein said means for generating a half-frame synchronization signal comprises an AND gate having a first input responsive to the half-frame synchronization signal and a second input electrically coupled to an output of the latch.

16. The circuit of claim 15, wherein the first and second edges of the shift clock signal are rising and falling edges, respectively; and wherein the latch is triggered by the falling edge of the shift clock signal.

17. A method of operating a serial interface circuit, comprising the steps of:
generating, in response to a frame synchronization signal, a half-frame synchronization signal as a first pulse during a first time interval;
serially transmitting first data from a plurality of registers within a shift register to an output thereof while simultaneously serially receiving second data into the plurality of registers;
transferring the second data in parallel from the shift register to a first data register, during a first-half of the first time interval; and
transferring additional first data from a second data register to the plurality of registers within the shift register, during a second-half of the first time interval.

18. An interface circuit, comprising:
a first data register that has a parallel input port and a parallel output port and is responsive to a first register control signal;
a second data register that has a parallel input port and a parallel output port and is responsive to a second register control signal;
a shift register that is responsive to a first edge of a first clock signal and has a serial input port, a serial output port, a parallel output port that is electrically coupled to the parallel input port of said first data register and a parallel input port that is electrically coupled to the parallel output port of said second data register;
a transfer register that is responsive to a second edge of the first clock signal and has a serial input port that is electrically coupled to the serial output port of said shift register;
a controller that generates the first and second register control signals in response to a frame synchronization signal and the first clock signal; and
wherein said controller generates a half-frame synchronization signal in response to the frame synchronization signal and comprises a data register controller that generates the first and second register control signals in response to the half-frame synchronization signal.

19. The interface circuit of claim 18, wherein the first and second edges of the first clock signal are falling and rising edges, respectively.

20. An interface circuit, comprising:
a first data register that is responsive to a first register control signal and a data input enable signal that is provided by a control bus;
a second data register that is responsive to a second register control signal and a data output enable signal that is provided by the control bus;
a shift register that is responsive to a shift clock signal and has a serial input port, a serial output port and a parallel input/output port electrically coupled to said first and second data registers; and
a controller that is configured to generate the first and second register control signals in response to a frame synchronization signal and the shift clock signal and is further configured to generate a half-frame synchronization signal in response to the frame synchronization signal.

21. The interface circuit of claim 20, wherein said controller comprises a data register controller that is configured to generate the first and second register control signals in response to the half-frame synchronization signal.

22. The interface circuit of claim 21, wherein the first register control signal is synchronized to a leading edge of the half-frame synchronization signal; and wherein the second register control signal has a leading edge that is synchronized to a trailing edge of the first register control signal and a trailing edge that is synchronized to a trailing edge of the half-frame synchronization signal.

* * * * *